United States Patent
Teyeb et al.

(10) Patent No.: US 12,520,364 B2
(45) Date of Patent: Jan. 6, 2026

(54) RRC RE-ESTABLISHMENT

(71) Applicant: Telefonaktiebolaget LM Ericsson (publ), Stockholm (SE)

(72) Inventors: Oumer Teyeb, Montréal (CA); Gunnar Mildh, Sollentuna (SE); Jari Vikberg, Järna (SE); Paul Schliwa-Bertling, Ljungsbro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 392 days.

(21) Appl. No.: 18/026,842

(22) PCT Filed: Sep. 22, 2020

(86) PCT No.: PCT/SE2020/050889
§ 371 (c)(1),
(2) Date: Mar. 17, 2023

(87) PCT Pub. No.: WO2022/066071
PCT Pub. Date: Mar. 31, 2022

(65) Prior Publication Data
US 2023/0337311 A1    Oct. 19, 2023

(51) Int. Cl.
*H04W 76/19*    (2018.01)
(52) U.S. Cl.
CPC .................. *H04W 76/19* (2018.02)
(58) Field of Classification Search
CPC .................................................... H04W 76/19
See application file for complete search history.

(56) References Cited

U.S. PATENT DOCUMENTS

| | | | |
|---|---|---|---|
| 9,516,550 B2* | 12/2016 | Xiong | H04W 76/27 |
| 2004/0224669 A1* | 11/2004 | Pedlar | H04W 76/27 455/403 |
| 2014/0179325 A1* | 6/2014 | Xu | H04W 76/19 455/437 |
| 2016/0330717 A1* | 11/2016 | Watfa | H04W 72/04 |
| 2018/0035484 A1* | 2/2018 | Kim | H04W 76/19 |
| 2020/0029334 A1* | 1/2020 | Wang | H04W 72/0466 |

FOREIGN PATENT DOCUMENTS

| | | |
|---|---|---|
| JP | 2020523946 A | 8/2020 |
| WO | 2017026263 A1 | 2/2017 |
| WO | 2019190382 A1 | 10/2019 |

OTHER PUBLICATIONS

"3GPP TS 36.423 V16.2.0", 3rd Generation Partnership Project; Technical Specification Group Radio Access Network; Evolved Universal Terrestrial Radio Access Network (E-UTRAN); X2 application protocol (X2AP) (Release 16), Jul. 2020, 1-489.

(Continued)

*Primary Examiner* — Harry H Kim
(74) *Attorney, Agent, or Firm* — Murphy, Bilak & Homiller, PLLC

(57) ABSTRACT

Methods and apparatus are provided. In an example aspect, a method in a User Equipment (UE) of performing a RRC re-establishment procedure is provided. The method comprises receiving an instruction from a network node to perform a RRC re-establishment procedure, and transmitting a RRC re-establishment request.

20 Claims, 9 Drawing Sheets

(56) References Cited

OTHER PUBLICATIONS

"3GPP TS 38.401 V16.2.0", 3rd Generation Partnership Project; Technical Specification Group Radio Access Network; NG-RAN; Architecture description (Release 16), Jul. 2020, 1-77.
"3rd Generation Partnership Project; Technical Specification Group Radio Access Network; NG-RAN; E1 Application Protocol (E1AP) (Release 16)", 3GPP TS 38.463 V16.2.0, Jul. 2020, 230 pages.
"3rd Generation Partnership Project; Technical Specification Group Radio Access Network; NR; User Equipment (UE) procedures in Idle mode and RRC Inactive state (Release 16)", 3GPP TS 38.304 V16.1.0, Jul. 2020, 39 pages.
"RRC Connection Reestablishment Failure Report", 3GPP TSG-RAN WG2#107, Tdoc R2-1910840, Ericsson, Prague, CZ, Aug. 26-30, 2019, 5 pages.
3GPP, "3GPP TS 36.331 V16.1.1", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1078.
3GPP, "3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340 V16.2.0, Jul. 2020, 1-78.
3GPP, "3rd Generation Partnership Project; Technical Specification Group Radio Access Network; NG-RAN; Xn application protocol (XnAP) (Release 16)", 3GPP TS 38.423 V16.2.0, Jul. 2020, 1-447.
3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, 1-906.
3GPP, "3rd Generation Partnership Project; Technical Specification Group Radio Access Network; NR; Radio Resource Control (RRC) protocol specification (Release 16)", 3GPP TS 38.331 V16.0.0, Mar. 2020, 1-835.
3GPP, "3rd Generation Partnership Project; Technical Specification Group Radio Access Network; Study of separation of NR Control Plane (CP) and User Plane (UP) for split option 2; (Release 15)", 3GPP TR 38.806 V15.0.0, Dec. 2017, 1-22.
3GPP, "3rd Generation Partnership Project; Technical Specification Group Services and System Aspects; Security architecture and procedures for 5G system (Release 16)", 3GPP TS 33.501 V16.3.0, Jul. 2020, 1-248.
3GPP, "3rd Generation Partnership Project; Technical Specification Group Services and System Aspects; System architecture for the 5G System (5GS); Stage 2 (Release 16)", 3GPP TS 23.501 V16.5.1, Aug. 2020, 1-440.

* cited by examiner

100

200

600

700

RRC RE-ESTABLISHMENT

TECHNICAL FIELD

Examples of the present disclosure relate to RRC re-establishment, such as for example a UE performing a RRC re-establishment procedure, or instructing a UE to perform a RRC re-establishment procedure.

BACKGROUND

The 5th generation (5G) New Radio (NR) cellular telecommunication system aims at supporting Ultra Reliable Low Latency Communication (URLLC). Examples of features of URLLC include PDCP duplication functionality to increase reliability, as well as make before break handover procedures to ensure minimal interruption time at handover, where a UE switches from one cell or beam to another.

Typical deployments of 5G NR systems are expected in the future to utilize cloud infrastructure that supports 5G Core Network and upper Radio Access Network (RAN) functionality such as the 3GPP defined gNodeB-Central unit-Control Plane (gNB-CU-CP) functionality. The cloud infrastructure differs in reliability from typical dedicated or specialized hardware which has traditionally been used to support cellular network functions. One such difference is the availability of the underlying hardware, which may be significantly less reliable for generic off the shelf cloud hardware compared to traditional dedicated hardware. Therefore, cloud deployment of telecommunication functions may introduce mechanisms for dealing with failures of the cloud infrastructure. Examples of such mechanisms include using distributed databases to provide persistent storage even in the case of failure one or more hardware nodes supporting this database.

Methods for ensuring reliable connections to UEs using URLLC may include setting up parallel user plane connections to the same UE, so that if one of the user plane connections is lost, it may be possible to continue data transmission via the other connection. Multiple user plane connections may be supported either using a single control plane connection (e.g. RRC, NAS connection), or with two independent control plane connections, which in turn requires that the device has dual radio capability and is able to set up two independent radio connections, which typically increases the cost of the UE. The latter solution also increases network complexity, as the network would need to both understand that the two control plane connections are related, and to ensure that these devices are steered to using different network resources to avoid single point of failure.

FIG. 1 illustrates an example scenario 100 for end to end redundant User Plane paths using Dual Connectivity. For example, FIG. 1 illustrates user plane resource configuration of dual PDU sessions when redundancy is applied. One Protocol Data Unit (PDU) Session 102 spans from the UE via Master NG-RAN node to a first User Plane Function (UPF1) acting as the PDU Session Anchor, and the other PDU Session 104 spans from the UE via Secondary NG-RAN node to UPF2 acting as the PDU Session Anchor. As described in 3GPP Technical Specification (TS) 37.340, which is incorporated herein by reference, a NG-RAN may realize redundant user plane resources for the two PDU sessions with two NG-RAN nodes (i.e. Master NG-RAN and Secondary NG-RAN as shown in FIG. 1) or a single NG-RAN node. In both cases, there is a single N2 interface towards AMF from the Master NG-RAN node.

Based on these two PDU Sessions 102 and 104, two independent user plane paths are set up. UPF1 and UPF2 connect to the same Data Network (DN), even though the traffic via UPF1 and UPF2 may be routed via different user plane nodes within the DN.

The 5G RAN architecture 200 is described in 3GPP TS 38.401, which is incorporated herein by reference, and is illustrated in FIG. 2. The NG architecture can be further described as follows:

The NG-RAN consists of a set of gNBs connected to the 5GC through the NG interface.

A gNB can support FDD mode, TDD mode or dual mode operation.

gNBs can be interconnected through the Xn interface.

A gNB may consist of a gNB-CU (central unit) and one or more gNB-DUs (distributed units).

A gNB-CU and a gNB-DU are connected via F1 logical interface.

A gNB-DU is connected to only one gNB-CU.

NG, Xn and F1 are logical interfaces. For NG-RAN, the NG and Xn-C interfaces for a gNB consisting of a gNB-CU and gNB-DUs terminate in the gNB-CU. For E-UTRAN-New Radio Dual Connectivity (EN-DC), the S1-U and X2-C interfaces for a gNB consisting of a gNB-CU and gNB-DUs terminate in the gNB-CU. The gNB-CU and connected gNB-DUs are only visible to other gNBs and the core network (5GC) as a gNB.

The NG-RAN is layered into a Radio Network Layer (RNL) and a Transport Network Layer (TNL). The NG-RAN architecture, i.e. the NG-RAN logical nodes and interfaces between them, is defined as part of the RNL. For each NG-RAN interface (NG, Xn, F1) the related TNL protocol and functionality are specified. The TNL provides services for user plane transport and signalling transport. In NG-Flex configuration, each gNB is connected to all Access and Mobility Management Functions (AMFs) within an AMF Region. The AMF Region is defined in 3GPP TS 23.501, which is incorporated herein by reference.

An open interface has been specified between the control plane (CU-CP) and the user plane (CU-UP) parts of the central unit (CU). The related specification is 3GPP TS 38.463, which is incorporated herein by reference. The open interface between CU-CP and CU-UP is named E1. The architecture is shown in FIG. 3, which illustrates a split gNB architecture. Three deployment scenarios for the split gNB are shown in 3GPP Technical Report (TR) 38.806, which is incorporated herein by reference:

Scenario 1: CU-CP and CU-UP centralized;
Scenario 2: CU-CP distributed and CU-UP centralized;
Scenario 3: CU-CP centralized and CU-UP distributed.

The E1 application protocol (E1AP) is defined in TS 38.463. The E1AP defines the messages that are exchanged between the CU-CP and the CU-UP for the sake of providing user-plane services to the UE.

In LTE and NR, the Radio Resource Control (RRC) protocol is used to setup, configure and maintain the radio connection between the UE and an eNB or gNB. When the UE receives an RRC message from the eNB or gNB, it will apply or "compile" the configuration, and if this succeeds the UE generates an RRC complete message that indicates the transaction ID of the message that triggered this response.

Since LTE-release 8 (rel-8), three Signaling Radio Bearers (SRBs), namely SRB0, SRB1 and SRB2, have been available for the transport of RRC and Non Access Stratum (NAS) messages between the UE and the eNB. A new SRB, known as SRB1bis, was also introduced in rel-13 for supporting DoNAS (Data Over NAS) in narrowband-Internet of Things (NB-IoT). SRB0 is for RRC messages using the CCCH logical channel, and is used for handling RRC connection setup, RRC connection resume and RRC connection re-establishment. Once the UE is connected to the eNB (i.e. RRC connection setup or RRC connection reestablishment/resume has succeeded), SRB1 is used for handling RRC messages (which may include a piggybacked NAS message) as well as for NAS messages prior to the establishment of SRB2, all using the DCCH logical channel. SRB2 is for RRC messages which include logged measurement information as well as for NAS messages, all using the DCCH logical channel. SRB2 has a lower priority than SRB1, because logged measurement information and NAS messages can be lengthy and could cause the blocking of more urgent and smaller SRB1 messages. SRB2 is always configured by E-UTRAN after security activation.

In rel-15, for the case of dual connectivity (LTE as the master node while NR is the secondary node, or vice versa, as well as dual connectivity using two NR nodes), split SRBs are introduced, where SRB1/2 can be transported via the radio resources of the master node or the secondary node (with the protocol being terminated at the master node). Additionally, a new SRB called SRB3 is introduced (if the secondary node is NR), that is used to directly transfer RRC messages from the secondary node to the UE for those messages that do not require co-ordination with the master node.

The majority of the RRC procedures are initiated by the network, e.g. to re-configure some behavior of the UE such as measurement reporting configuration, lower layer configuration, radio bearer configuration, etc. Typically the UE acknowledges the RRC message from the network with an RRC reply message indicating that the new configuration has been adopted. Some RRC procedures are also initiated by the UE, such as:

Measurement reports (e.g. used for UE mobility)
RRC re-establishment in case of connection failure
Initial RRC connection setup (e.g. if the UE is IDLE mode and need to transition to connected)

RRC relies on PDCP/RLC/MAC protocols to guarantee lossless, in-order, duplication free delivery of RRC messages. The in-order delivery is ensured by the PDCP sequence number, meaning that PDCP only delivers an RRC message (e.g. delivers to a later above the PDCP layer) if it has a PDCP sequence number which is the next expected PDCP sequence number (i.e. the number is one more than the PDCP sequence number of last delivered message). This means that if the network loses knowledge of the next PDCP sequence number that is expected by a UE, it would not be able to send any RRC message to the UE since if the network does not guess the exact sequence number correctly the message will not be delivered by the PDCP layer in the UE to a higher layer (e.g. the RRC layer) in the UE.

In addition to the RRC protocol, the UE is also controlled by the NAS protocol which is between the UE and the core network. The NAS protocol is delivered embedded within RRC messages.

FIG. 4 illustrates an example of a control plane (CP) protocol stack 400 in NR and FIG. 5 illustrates an example of a user plane (UP) protocol stack 500 in NR, where the CU/DU split architecture is employed (where the CU is also split into CU-UP and CU-CP). Note that the CU-CP/CU-UP split is a functional split and as such the two functionalities can reside either in the same node or different node or even one of the functionalities, i.e. the CU-UP or CU-CP, for a given gNB can be physically realized in several physical nodes/entities can be distributed physically. For example, several instances of the CU-UP/CU-CP for a given gNB can exist in an operator's cloud, for redundancy or for load balancing purposes.

If a connection with a UE fails, e.g. due to radio link failure, handover failure (T304 timer expiry) or inability to comply with RRC message, integrity verification failure etc., the UE will initiate an RRC re-establishment procedure. In NR, this is captured in TS 38.331, which is incorporated herein by reference, in section 5.3.7. FIG. 6 shows an example of a RRC connection re-establishment (successful) procedure 600, and FIG. 7 shows an example of a RRC re-establishment with fallback to RRC establishment (successful) procedure 700. The purpose of the re-establishment procedure is to re-establish the RRC connection. A UE in RRC_CONNECTED state, for which AS security has been activated with SRB2 and at least one DRB setup, may initiate the RRC re-establishment procedure in order to continue the RRC connection. The connection re-establishment succeeds if the network is able to find and verify a valid UE context for the UE or, if the UE context cannot be retrieved, the network responds with an RRCSetup message as shown in FIG. 7 for example.

The network applies the procedure for example as follows:

When AS security has been activated and the network retrieves or verifies the UE context:
re-activate AS security without changing algorithms;
re-establish and resume SRB1;
When UE is re-establishing an RRC connection, and the network is not able to retrieve or verify the UE context:
discard the stored AS Context and release all RBs;
fallback to establish a new RRC connection.

If AS security has not been activated, the UE shall not initiate the procedure but instead moves to RRC_IDLE state directly, with release cause 'other'. If AS security has been activated, but SRB2 and at least one DRB are not setup, the UE does not initiate the procedure but instead moves to RRC_IDLE directly, with release cause 'RRC connection failure'.

The UE can re-establish to a node different from the one it was connected to before detecting a problem. When the target network node receives the RRCReestablishmentRequest message (e.g. illustrated in FIG. 6 or 7), it can use the ReestabUE-Identity that is included in the request message to attempt to locate the old UE context for the UE. If the target network node can locate the context, it can transmit the RRCReestablishment message to the UE and the UE will restore the old configurations. If the target network node cannot find the UE context, it has to perform a NAS recovery and instead sends an RRCSetup message to the UE as illustrated in FIG. 7 for example.

The target network node will transmit the RETRIEVE UE CONTEXT REQUEST to the source node (as defined in TS 38.423/36.423, which are incorporated herein by reference), i.e. the node to which the UE was connected before the connection failure, and the source node can respond with the RETRIEVE UE CONTEXT RESPONSE (if the UE identification and verification is successful). If successful, the RETRIEVE UE CONTEXT RESPONSE will contain the HandoverPreparationInformation message, defined in TS 38.331, that contains the UE context. Once the UE has received the RRCReestablishment message, restored some configurations (e.g. SRB1) and reestablished the connection, it will transmit the RRCReestablishmentComplete message to the network. The network will then send an RRCReconfiguration message to the UE which will restore and possibly reconfigure the rest of the configurations in the UE.

In the context of CU/DU split, the re-establishment procedure is shown in FIG. 8 (from TS 38.401, section 8.7), which shows an example of a RRC re-establishment procedure 800 in the case of CU/DU split architecture. The steps in this procedure are as follows:
1. UE sends preamble to the gNB-DU.
2. The gNB-DU allocates new C-RNTI and responds UE with Random Access Response (RAR).
3. The UE sends RRCReestablishmentRequest message to the gNB-DU, which contains old C-RNTI and old Physical Cell ID (PCI).
4. The gNB-DU includes the RRC message and the corresponding low layer configuration for the UE in the INITIAL UL RRC MESSAGE TRANSFER message and transfers to the gNB-CU. The INITIAL UL RRC MESSAGE TRANSFER message should include C-RNTI.
5. The gNB-CU includes RRCReestablishment message and transfers to the gNB-DU. If the UE requests to re-establish RRC connection in the last serving gNB-DU, the DL RRC MESSAGE TRANSFER message shall include old gNB-DU UE F1AP ID.
6. The gNB-DU retrieves UE context based on old gNB-DU UE F1AP ID, replaces old C-RNTI/PCI with new C-RNTI/PCI. It sends RRCReestablishment message to UE.
7-8. The UE sends RRCReestablishmentComplete message to the gNB-DU. The gNB-DU encapsulates the RRC message in UL RRC MESSAGE TRANSFER message and sends to gNB-CU.
9-10. The gNB-CU triggers UE context modification procedure by sending UE CONTEXT MODIFICATION REQUEST, which may include DRBs to be modified and released list. The gNB-DU responses with UE CONTEXT MODIFICATION RESPONSE message.
9'-10'. The gNB-DU triggers UE context modification procedure by sending UE CONTEXT MODIFICATION REQUIRED, which may include DRBs to be modified and released list. The gNB-CU responses with UE CONTEXT MODIFICATION CONFIRM message.
NOTE: Here it is assumed that UE accesses from the original gNB-DU where the UE contexts are available for that UE, and either step 9-10 or step 9' and 10' may exist or both could be skipped.
NOTE: If UE accesses from a gNB-DU other than the original one, gNB-CU should trigger UE Context Setup procedure towards this new gNB-DU.
11-12. The gNB-CU includes RRCReconfiguration message into DL RRC MESSAGE TRANSFER message and transfers to the gNB-DU. The gNB-DU forwards it to the UE.
13-14. The UE sends RRCReconfigurationComplete message to the gNB-DU, and gNB-DU forwards it to the gNB-CU.

The signaling radio bearers (SRBs) used for delivery of RRC messages provide lossless, duplication free, in-order delivery of RRC messages. It is the responsibility of the PDCP layer to ensure in order and duplication free delivery to layer(s) above the PDCP layer. It does this by assigning a PDCP sequence number to every message. The sequence number is transferred in the PDCP header of a PDCP message. The receiving PDCP entity (e.g. in the UE) will only deliver a RRC message within a PDCP packet to the RRC layer if the PDCP sequence number of the packet that contains the RRC message is the next expected PDCP sequence number (which is the PDCP sequence number last used plus one). If the network uses a PDCP sequence number which is smaller than the PDCP sequence number last used before the failure, the UE will consider the packet a duplicate and discard it. If the network uses a PDCP sequence which is larger than the next expected PDCP sequence number in the UE, the UE will store the message in the PDCP layer and wait for the missing packet(s) with the missing sequence number(s). For example, if the last received RRC message before the CP failure was within a PDCP packet with sequence number (SN) x, and a RRC message is received with SN x+2, the PDCP layer will wait for a PDCP packet with SN x+1 before forwarding a RRC message in the PDCP packet with SN x+2 to the RRC layer. That is, if a packet with SN x+1 is not received, the packet with SN x+2 will be stored indefinitely in the UE and its contents will not be delivered to a higher layer. Since the PDCP sequence number wraps around, the determination if an out of sequence packet is a duplicate or future out of sequence packet is based on if the packet is within our outside of the PDCP receive window.

During the initiation of the re-establishment procedure (according to section 5.3.7.2 in TS 38.331), the UE:
resets the MAC (i.e. any pending data at the MAC level will be flushed)
both carrier aggregation (CA) and dual connectivity (DC) are released
all DRBs and SRBs (except SRB0, which is used for sending the re-establishment message) are suspended The UE then starts timer T311 and performs cell re-selection, which could select the same primary cell that it was previously connected to, or another cell. If the timer expires before a suitable cell is found, NAS recovery has to be performed via IDLE mode. If a suitable cell is found, the UE applies default MAC and control channel configurations, starts timer T301, and sends the RRC re-establishment request message to the chosen cell (including UE identity, a security checksum called short MAC-I that is computed using the old RRC integrity that it was using before re-establishment is triggered, and a re-establishment cause, which can take one of the following values: radio link failure, reconfiguration failure, handover failure, or other failure). If timer T301 expires before the UE receives the RRCReestablishment message from the network, UE has to perform NAS recovery via IDLE mode.

On receiving the RRCReestablishment message, which contains the NCC (Next hop Chaining Count), the UE uses the NCC value to derive new user plane and control plane encryption and integrity protection keys to be used for the connection, including for verification of the integrity of the received Reestablishment message. The network always sends an RRC Reconfiguration message after the Reestablishment message (referred to as "first reconfiguration after re-establishment" in the specifications). This reconfiguration message contains a full configuration flag and thus resets the whole radio configuration (except the C-RNTI and the access stratum security configuration associated with the master key) and replaces it with a new one. Additionally, the reestablishPDCP field will be included for each SRB/DRB, which will re-establish the PDCP entity of each SRB/DRB. Re-establishment of the PDCP will result in the reconfiguration of the PDCP entities to use the new ciphering and integrity protection keys calculated on the reception of the Reestablishment message, and for the transmitting PDCP entities, to transmit any pending PDCP packets after protecting them with the new keys ("pending" here means those packets which were already sent, protected using the old security keys, but the acknowledgement of their reception was not received). Also, for SRBs, re-establishment of the PDCP means the reset of the sequence numbers to initial values.

The main reason for the use of the NCC and update of the security keys is that from a security perspective re-use the same sequence number (Count) and security key for different data should be avoided, which could otherwise happen during re-establishment as the sequence numbers of the SRBs are re-set. This is due to the ciphering principle in 3GPP networks (as shown in 3GPP TS 33.501, which is incorporated herein by reference, in figure D2.1.1-1) being based on XORing the data (plaintext block) with a security bitstream (keystream block) generated by the ciphering algorithm based on a key, sequence number etc. It could be possible to remove this security bitstream by XORing two messages which has been encrypted with the same bitstream. The remaining bits will then be just an XOR of the two original messages. If an attacker could then guess one of the messages it would automatically also be able to decode the other message. Figure D2.1.1-1 of 3GPP TS 33.501 is shown in FIG. 9.

The RRC connection re-establishment procedure can be used to resynchronize the network and the UE. It does however always lead to a reset of the user plane, meaning for instance the user plane Data Radio Bearers (DRBs) are suspended, and any packets in the lower layer state machines (e.g. RLC/MAC) are flushed. Studies show that a typical RRC connection re-establishment procedure will cause a user plane service interruption of 100 ms or more. This could be considerably longer in reality, as the re-establishment is also controlled by several timers that have configurable values (e.g. T310, which is started when detecting physical layer problems can be up to 2 seconds long, and UE will not initiate the re-establishment procedure until this timer expires). Typically, this is not a problem for normal mobile broadband (MBB) users or other users since the overall performance of connection will not be significantly affected by such a service interruption. For connections requiring URLLC however this service interruption could mean URLLC requirements, such as for example latency and/or reliability, are not fulfilled.

In URLLC communications, the survival time is the time that an application consuming an URLLC communication service may continue without an anticipated message. If communication service recovery (e.g. RRC re-establishment) is not completed before survival time expires, the end user application considers the communication service as unavailable and may for example begin taking emergency actions to recover. The survival time also puts limits on the allowed user plane interruption time (e.g. at UE mobility). The survival time is a key requirement since it puts limits on how fast the system needs to recover from a failure to avoid application downtime. If the recovery time after a communication failure is shorter than the survival time, the failure may pass unnoticed by the application. Examples of use cases with a demanding survival time include public safety drones, which may have a survival time of approximately 100 ms; and industrial automation use cases in which traffic is cyclic, with frequent small packets, typically using Industrial Ethernet. The survival time in these cases may allow loss of a single packet or a few consecutive packets. For example, Motion Control may have a survival time of 0-2 ms, PLC to PLC communication 8-48 ms and Automated Guided Vehicle (AGV) 40-500 ms.

SUMMARY

One aspect of the present disclosure provides a method in a User Equipment (UE) of performing a RRC re-establishment procedure. The method comprises receiving an instruction from a network node to perform a RRC re-establishment procedure, and transmitting a RRC re-establishment request.

Another aspect of the present disclosure provides a method in a network node of instructing a User Equipment (UE) to perform a RRC re-establishment procedure. The method comprises determining that a first base station control plane function associated with a UE is unavailable, and sending an instruction to the UE to perform a RRC re-establishment procedure to cause the UE to re-establish at least a control plane connection with a second base station control plane function.

A further aspect of the present disclosure provides apparatus in a User Equipment (UE) for performing a RRC re-establishment procedure. The apparatus comprises a processor and a memory. The memory contains instructions executable by the processor such that the apparatus is operable to receive an instruction from a network node to perform a RRC re-establishment procedure, and transmit a RRC re-establishment request.

A still further aspect of the present disclosure provides apparatus in a network node of instructing a User Equipment (UE) to perform a RRC re-establishment procedure. The apparatus comprises a processor and a memory. The memory contains instructions executable by the processor such that the apparatus is operable to determine that a first base station control plane function associated with a UE is unavailable, and send an instruction to the UE to perform a RRC re-establishment procedure to cause the UE to re-establish at least a control plane connection with a second base station control plane function.

An additional aspect of the present disclosure provides apparatus in a User Equipment (UE) for performing a RRC re-establishment procedure. The apparatus is configured to receive an instruction from a network node to perform a RRC re-establishment procedure, and transmit a RRC re-establishment request.

Another aspect of the present disclosure provides apparatus in a network node for instructing a User Equipment (UE) to perform a RRC re-establishment procedure. The apparatus is configured to determine that a first base station control plane function associated with a UE is unavailable, and send an instruction to the UE to perform a RRC re-establishment procedure to cause the UE to re-establish at least a control plane connection with a second base station control plane function.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

Figure 1:
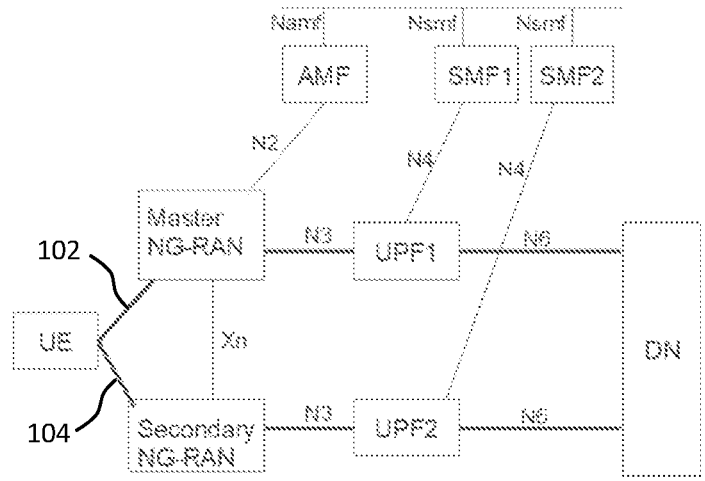
FIG. 1 shows an example scenario for end to end redundant User Plane paths using Dual Connectivity (DC)
Figure 2:
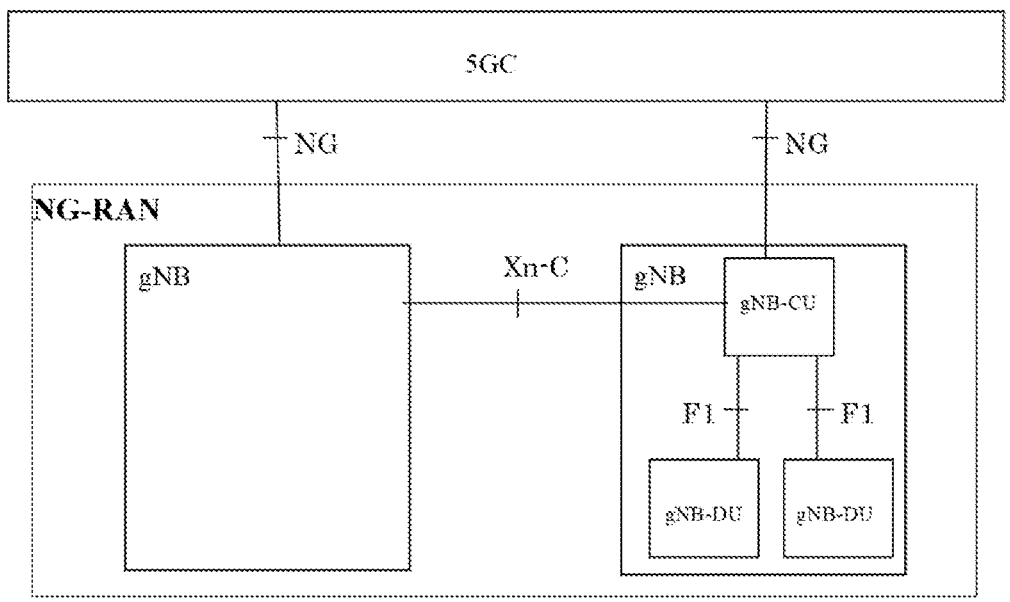
FIG. 2 illustrates an example of a 5G Radio Access Network (RAN) architecture.
Figure 3:
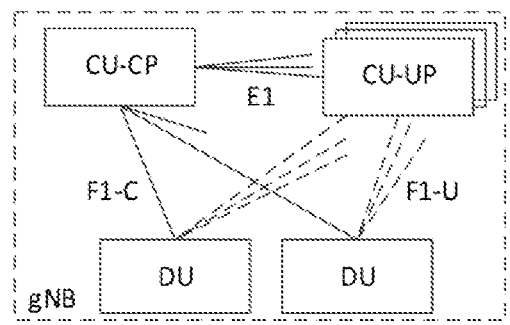
FIG. 3 illustrates a split gNodeB architecture.
Figure 4:
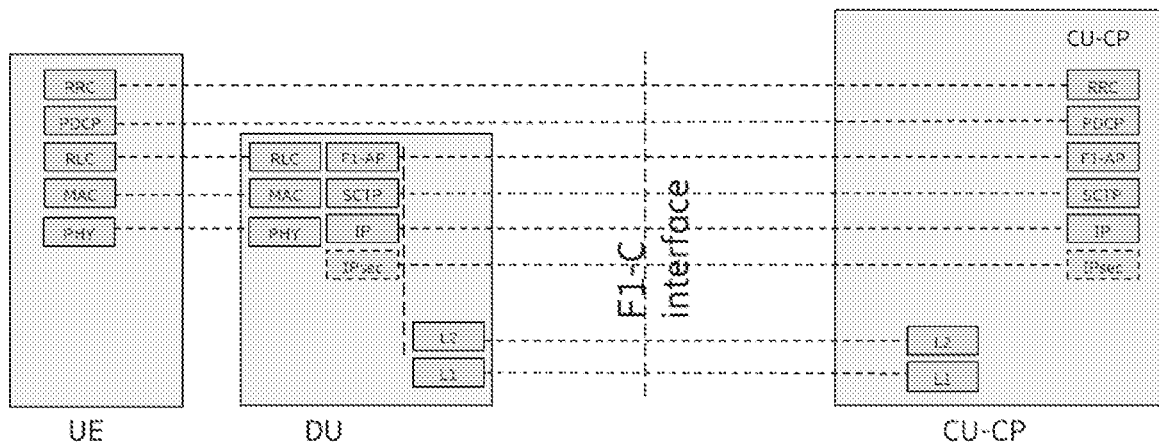
FIG. 4 illustrates an example of a control plane (CP) protocol stack.
Figure 5:
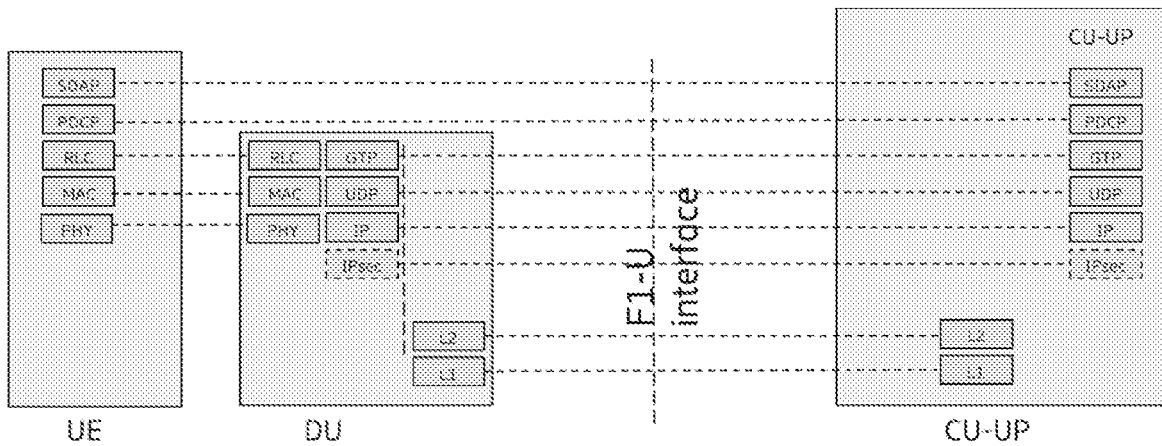
FIG. 5 illustrates an example of a user plane (UP) protocol stack.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

There may be at least three possible scenarios after the failure or unavailability. of a control plane function, and re-start or relocation of the control plane function. In some examples, relocation of the control plane function may mean that a different control plane function assumes responsibility of control plane functions/functionality for UE(s) and DU(s) that were served by the failed or unavailable control plane function. In a first scenario, the network and UE context are sync. For example, the UE has received and properly applied/compiled the last RRC message sent by the network to the UE, and the next expected PDCP sequence number (SN) for SRB1 will be the same as the next sequence number transmitted by the network. In this scenario, the next RRC message sent by the network will be received in sequence at the PDCP layer and thus forwarded to a layer above the PDCP layer such as for example the RRC layer.

In a second scenario, the network has a more up to date context. For example, the network has updated the UE context according to the latest RRC message it has sent, and has also incremented the PDCP SN for SRB1, but the message has not arrived at the UE (e.g. the control plane function failed before the message has arrived at the DU or the UE). Thus, the next RRC message sent by the network will have a larger SN than the UE expects and will be stored indefinitely by the UE, while the UE waits for one or more packets or messages that it considers to be missing.

In a third scenario, the UE has a more up to date context. This may happen for example if the network waits until it receives an acknowledgement from the UE of the RRC message before it updates the stored UE context, and the control plane function fails before the reception of the acknowledgement, even though the UE has received and applied the RRC message and sent the acknowledgement. In this case, the next RRC message sent by the network will have a lower SN than the UE expects and will be considered as a duplicate and will be dropped.

Embodiments of this disclosure may for example ensure a context resynchronization between the UE and the network is performed upon control plane recovery (e.g. restart or relocation of a control plane function for one or more UEs). Example embodiments may also achieve this without any service discontinuity, particularly for user plane data radio bearers (DRBs). Example embodiments provide a mechanism to cause the UE to perform a re-establishment procedure to effect a context resynchronization between the UE and the network when a control function associated with (e.g. serving) the UE is unavailable. In addition, a control plane only re-establishment procedure is provided in some examples that does not affect the operation of the user plane data radio bearers.

Advantages of example embodiments may include one or more the following. The network may cause the UE to perform the re-establishment procedure in order to synchronize the Ue context, configuration, RRC state etc. between the network and the UE. The triggering of re-establishment at present is only performed based on conditions at the UE, e.g. detection of radio link failure and the reception of a reconfiguration that the UE was not able to compile, and hence is UE driven. Therefore, example embodiments introduce a network-driven RRC re-establishment procedure. A control plane re-establishment procedure is provided in some examples that does not impact the user plane data radio bearers, and may ensure that the Quality of Service (QoS) requirements at a UE for bearers/services with stringent latency and survival time requirements (e.g. URLLC) can be fulfilled even in the case of unavailability of a control plane function associated with or serving the UE. Signaling optimization may also be achieved in some examples: if the network realizes that the context of the UE at the network and UE are in synchronization, there will be no need to send a reconfiguration message after re-establishment, which is always required at present. Even if a re-synchronization is required, a partial reconfiguration may be sent instead of a full reconfiguration in some examples.

In examples of this disclosure, a control plane function where referred to may comprise for example a central unit-control plane (CU-CP).

Figure 10:
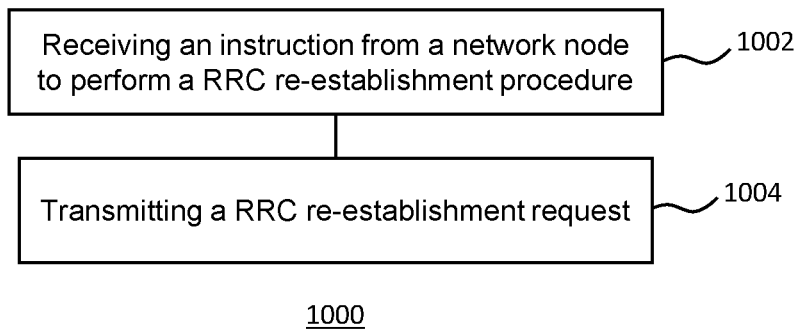
FIG. 10 is a flow chart of a method in a User Equipment (UE) of performing a RRC re-establishment procedure.

FIG. 10 is a flow chart of a method 1000 in a User Equipment (UE) of performing a RRC re-establishment procedure. The method comprises, in step 1002, receiving an instruction from a network node (e.g. a distributed unit, DU)

to perform a RRC re-establishment procedure. The method 1000 also comprises, in step 1004, transmitting a RRC re-establishment request. Thus for example the method 1000 may provide a network-driven or network-initiated RRC re-establishment procedure.

In some examples, the RRC re-establishment request comprises a request to re-establish only a RRC control plane connection for the UE. This may be useful for example where the control plane function serving the UE has failed or is unavailable. In some examples, therefore, the control plane-only RC re-establishment procedure may not affect operation of the user plane in the UE, and thus for example user plane DRBs may be unaffected. In some examples, the type of message and/or an indication in the message such as a flag or information element (IE) may indicate that the RRC re-establishment request is for control plane-only re-establishment.

Additionally or alternatively, in some examples, the instruction from the network node comprises an instruction to perform a control-plane only re-establishment procedure. For example, the type of message containing the instruction may indicate that the RRC re-establishment procedure is for the control plane only, and/or the message may contain an indication (e.g. a flag or IE) indicating that the RRC re-establishment procedure is for the control plane only. Thus, for example, where the procedure is for the control plane only, the method 1000 may in some examples comprise maintaining a user plane UE context for the UE. This may comprise for example continuing to use one or more data radio bearers (DRBs) configured before receiving the instruction. In some examples, this may ensure that there is little or no disruption to the user plane operation of the UE. In some examples, the method 1000 comprises performing the RRC re-establishment procedure without suspending user plane data radio bearers (DRBs).

In some examples, the UE is associated with a first base station control plane function before receiving the instruction, and the RRC re-establishment procedure re-establishes a control plane connection to a second base station control plane function. The first and/or second control plane function may be for example a central unit-control plane (CU-CP). The method 1000 may thus comprise for example receiving a RRC re-establishment message from the second base station control plane function in response to the RRC re-establishment request, instead of from the first control plane function. In some examples, the instruction is received from the second base station control plane function, and in some examples via the network node.

The method 1000 may in some examples comprise refraining from flushing a MAC buffer and/or a RLC buffer during, and/or without resetting a next expected RRC message sequence number during the RRC re-establishment procedure. Such features may in some examples reduce or eliminate any impact on user plane functionality of the UE.

Figure 6:
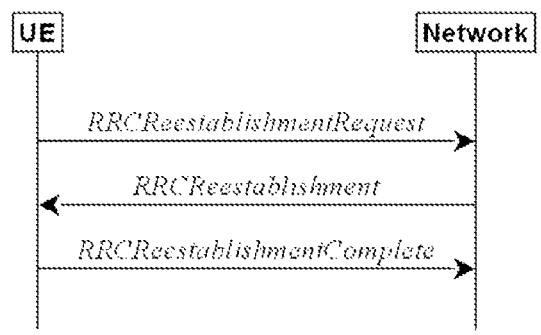
FIG. 6 shows an example of a RRC connection re-establishment (successful) procedure.
Figure 7:
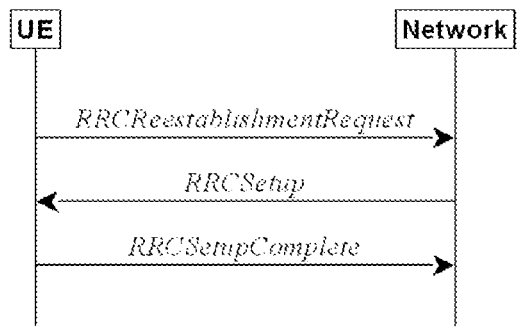
FIG. 7 shows an example of a RRC re-establishment with fallback to RRC establishment (successful) procedure.
Figure 8:
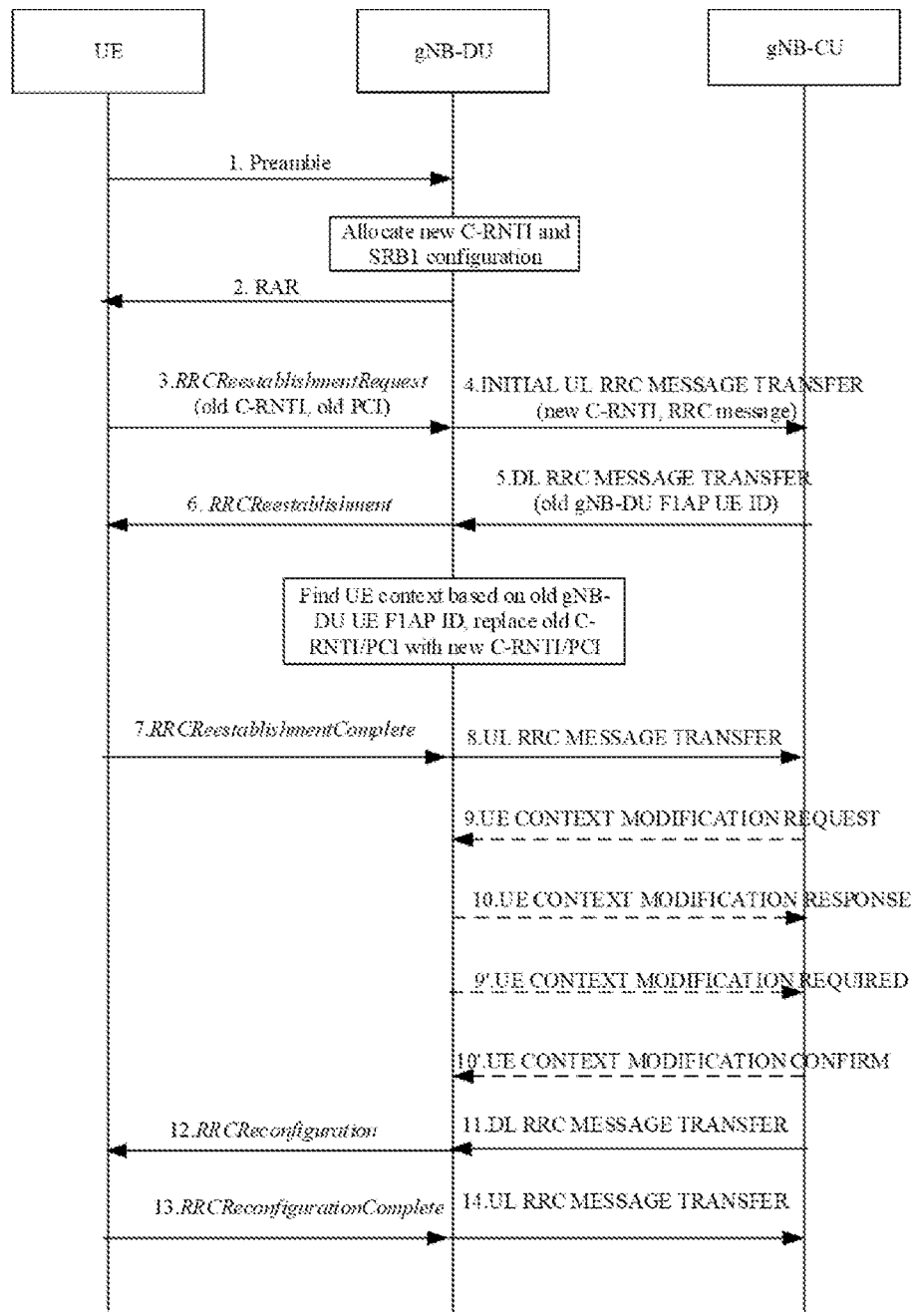
FIG. 8 shows an example of a RRC re-establishment procedure in case of CU/DU split architecture.
Figure 9:
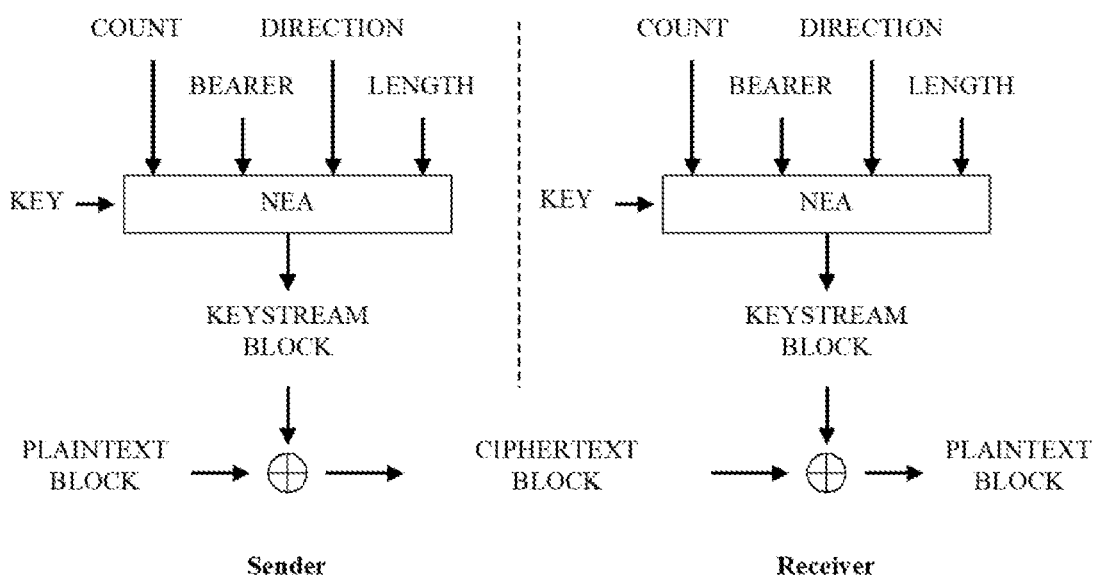
FIG. 9 shows Figure D2.1.1-1 of 3GPP TS 33.501.

In some examples, the method 1000 comprises performing the RRC re-establishment procedure (e.g. the procedure shown in FIG. 6), wherein the RRC re-establishment procedure includes step 1004 of transmitting the RRC re-establishment request (e.g. step 1004 is the first step shown in FIG. 6).

In some examples, receiving the instruction from the network node comprises receiving a RRC message from the network node, performing integrity verification on the RRC message using an integrity verification key, and determining that the RRC message is an instruction to perform a RRC re-establishment procedure if the integrity verification fails. Thus, for example, the network node (or other node in the network) may intentionally perform encryption or integrity protection on the RRC message using an incorrect or alternate integrity protection key, and thus the message will fail integrity protection at the UE. This may trigger a RRC re-establishment procedure. In some examples, a control plane-only re-establishment procedure may be attempted first, followed by a "full" re-establishment procedure if the control plane-only procedure is not successful. Thus, failure of the integrity verification at the UE may in some examples be an implied instruction to perform a RRC re-establishment procedure (control plane-only or otherwise).

The instruction received in step 1002 may in some examples be received in a MAC control element (CE), in Downlink Control Information (DCI) transmitted over a Physical Downlink Control Channel (PDCCH), in a flag in a System Information Block (SIB), or in a broadcast message.

In some examples, the RRC re-establishment request includes an indication that the RRC re-establishment procedure is a control-plane only re-establishment procedure. Additionally or alternatively, in some examples, the RRC re-establishment request includes an indication of a sequence number of a most recently received RRC message before receiving the instruction.

Figure 11:
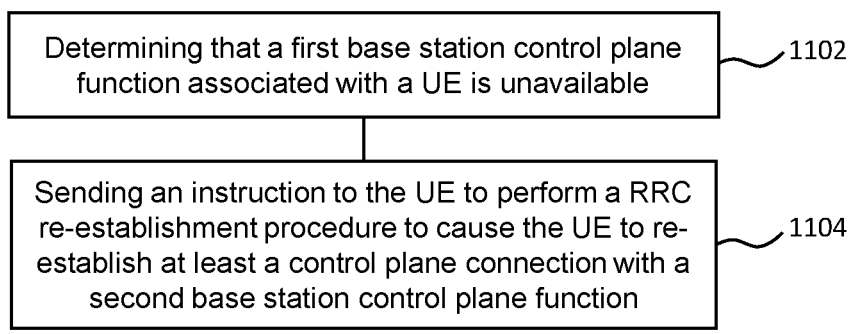
FIG. 11 is a flow chart of a method in a network node of instructing a User Equipment (UE) to perform a RRC re-establishment procedure.

FIG. 11 is a flow chart of a method 1100 in a network node of instructing a User Equipment (UE) to perform a RRC re-establishment procedure. The network node may comprise for example a distributed unit (DU) or any other suitable network node or function. The method 1100 comprises, in step 1102, determining that a first base station control plane function (e.g. a CU-CP) associated with (e.g. serving) a UE is unavailable. For example, the first control plane function may have failed. Step 1104 of the method 1100 comprises sending an instruction to the UE to perform a RRC re-establishment procedure to cause the UE to re-establish at least a control plane connection with a second base station control plane function. This may in some examples be the instruction received by the UE in step 1002 referred to above. The instruction may be sent in a MAC control element (CE), in Downlink Control Information (DCI) transmitted over a Physical Downlink Control Channel (PDCCH), in a flag in a System Information Block (SIB), or in a broadcast message in some examples.

In some examples, the method may comprise, after sending the instruction to the UE, receiving a RRC re-establishment request from the UE, and forwarding the RRC re-establishment request to the second base station control plane function. The second base station control plane function (e.g. a CU-CP) may therefore be a control plane function that takes over responsibility for serving the UE, and thus becomes associated with the UE, for example as a result of the re-establishment procedure. In some examples, the RRC establishment request comprises a request to re-establish only a RRC control plane connection for the UE (e.g. as indicated in the request). Additionally or alternatively, the instruction sent to the UE comprises an instruction to perform a control-plane only re-establishment procedure, as suggested above in some examples. The RRC re-establishment request may in some examples include an indication that the RRC re-establishment procedure is a control-plane only re-establishment procedure. The RRC re-establishment request may in some examples include an indication of a sequence number (SN) of a most recently received RRC message before receiving the instruction.

In some examples, the method 1100 comprises maintaining a user plane UE context for the UE. This may this ensure little or no user plane disruption for the UE. Maintaining the user plane UE context for the UE in some examples comprises continuing to use one or more data radio bearers (DRBs) that were configured before step 1102 and/or 1104. In some examples, the instruction comprises an instruction to the UE to perform a RRC re-establishment procedure without suspending user plane data radio bearers (DRBs).

The UE may be associated with a first base station control plane function (e.g. CU-CP) before receiving the instruction in some examples. The RRC re-establishment procedure may then re-establishes a control plane connection to a second base station control plane function (e.g. CU-CP).

In some examples, sending the instruction to the UE in step 1104 comprises receiving the instruction from the second base station control plane function, and forwarding the instruction to the UE. Thus in these examples the second control plane function may initiate the re-establishment procedure via the network node (e.g. DU).

Sending the instruction to the UE in some examples comprises encrypting and RRC message with an incorrect encryption key, and forwarding the RRC message to the UE, e.g. similar to the procedure as described above.

Figure 12:
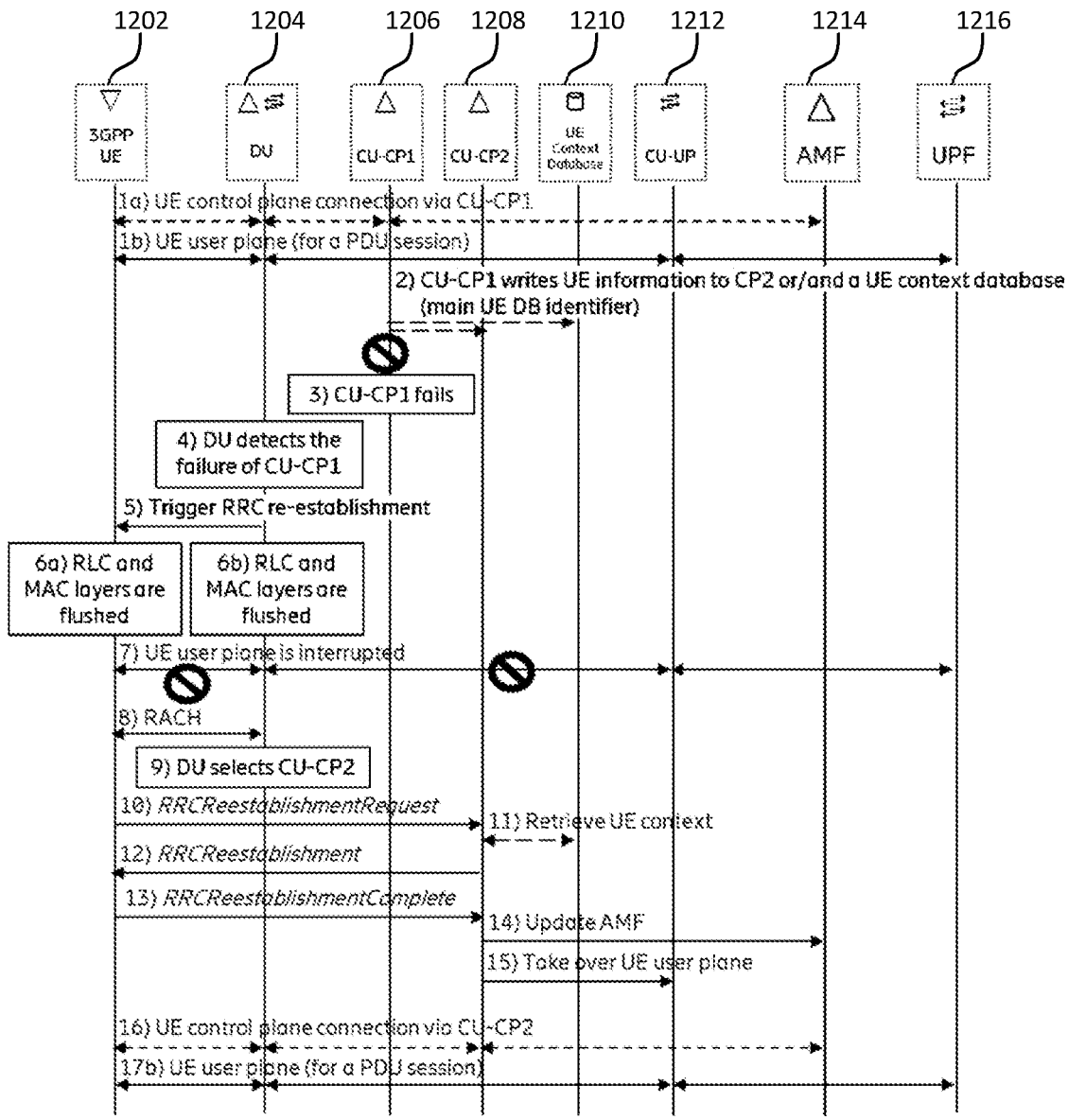
FIG. 12 shoes a particular example embodiment of communications in a network.

FIG. 12 shoes a particular example embodiment of communications 1200 in a network during a method as described herein. The network includes a UE 1202, DU 1204, first control plane function CU-CP1 1206, second control plane function CU-CP2 1208, UE context database 1210, central unit-user plane (CU-UP) 1212, Access and Mobility Management Function (AMF) 1214 and User Plane Function (UPF) 1216.

In this example, a RRC re-establishment procedure can be used to re-synchronize the UE and the network. This example may in some cases lead to a delay or user plane data transmission/reception interruption, however this may still be faster in some examples than NAS recovery where the UE has to establish the connection from scratch (e.g. NAS recovery). However, current procedures do not allow for network-initiated re-establishment.

In step 1*a*) of the communications 1200 of FIG. 12, the UE 1202 has a control plane connection to AMF 1214 via Su 1204 and CU-CP1 1206, and in step 1*b*), the UE 1202 has a user plane connection for a PDU session to UPF 1216 via DU 1204 and CU-UP 1212. In step 2), CU-CP1 writes UE information to CU-CP2 1208 and/or UE context database 1210. Thus for example UE context(s) may be stored or updated for the UE. In step 3), CU-CP1 1206 fails or becomes unavailable for another reason. In step 4), DU 1204 detects failure or unavailability of CU-CP1 1206. In step 5, DU 1204 triggers RRC re-establishment in the UE 1202, for example in accordance with steps 1002 and 1104 described above.

In step 6*a*), RLC and MAC layers are flushed in the UE 1202, and in step 6*b*) RLC and MAC layers are flushed in the DU 1204. Thus in step 7) the user plane connection is interrupted. In step 8), in the example shown, there is a random access procedure (RACH). For example, a random access and random access response (RAR) procedure is performed between the UE and the DU. The UE sends a special Preamble on the Random Access Channel (RACH), the network (e.g. DU) responds with random access response (RAR) a "grant" including uplink resource assignment for sending uplink RRC signalling. The RAR message may also contain time alignment information for ensuring uplink time synchronization.

In step 9), the DU 1204 selects CU-CP2 1208. In step 10, the UE 1202 sends a RRC re-establishment request, e.g. in accordance with step 1004 described above. In step 11), CU-CP2 1208, which receives the request, retrieves the UE context from UE context database 1210. CU-CP2 1208 then sends a RRCReestablishment message to the UE 1202 in step 12). In step 13), the UE 1202 replies to the CU-CP2 1208 with a RRCReestablishmentComplete message.

In step 14), the CU-CP2 1208 updates the AMF 1214 (for example, CU-CP2 1208 updates the NG-C interface to the AMF 1214, for example by performing a Path Switch procedure indicating only move of NG-AP signaling association). In step 15), in this example, the same CU-UP 1212 is still used and the CU-CP2 1208 takes over the relevant UE contexts in the CU-UP 1212. In step 16), CU-CP2 1208 may trigger an optional resynchronization of the UE RRC state. This step may depend on the UE Context Database 1210 context, for example if there are any pending RRC procedures towards the UE. In step 17*b*), UE 1202 has a user plane connection for a PDU session to UPF 1216 via DU 1204 and CU-UP 1212.

During normal conditions, in some examples, the CU-CP1 1206 that is currently serving the UE continuously or periodically stores or updates the UE context in a backup control plane function (CU-CP2 1208) or a UE context database 1210. The DU 1204 can detect unavailability of the control plane function CU-CP1 1206 in one of several ways, such as for example:

Lack of response to SCTP keep alive requests
Not receiving a response to F1-AP messages such as F1-AP context modification required within a given time
Receiving an explicit indication from the failed CU-CP (upon re-start) or a new CU-CP that has taken over responsibility from the unavailable control plane function.

If the CU-CP2 already has the UE context(s) (e.g. if the UE context was being kept updated in the CU-CP2 1208 in step 2)), there is no need for a UE context retrieval from a context retrieval database in step 11.

Figure 13:
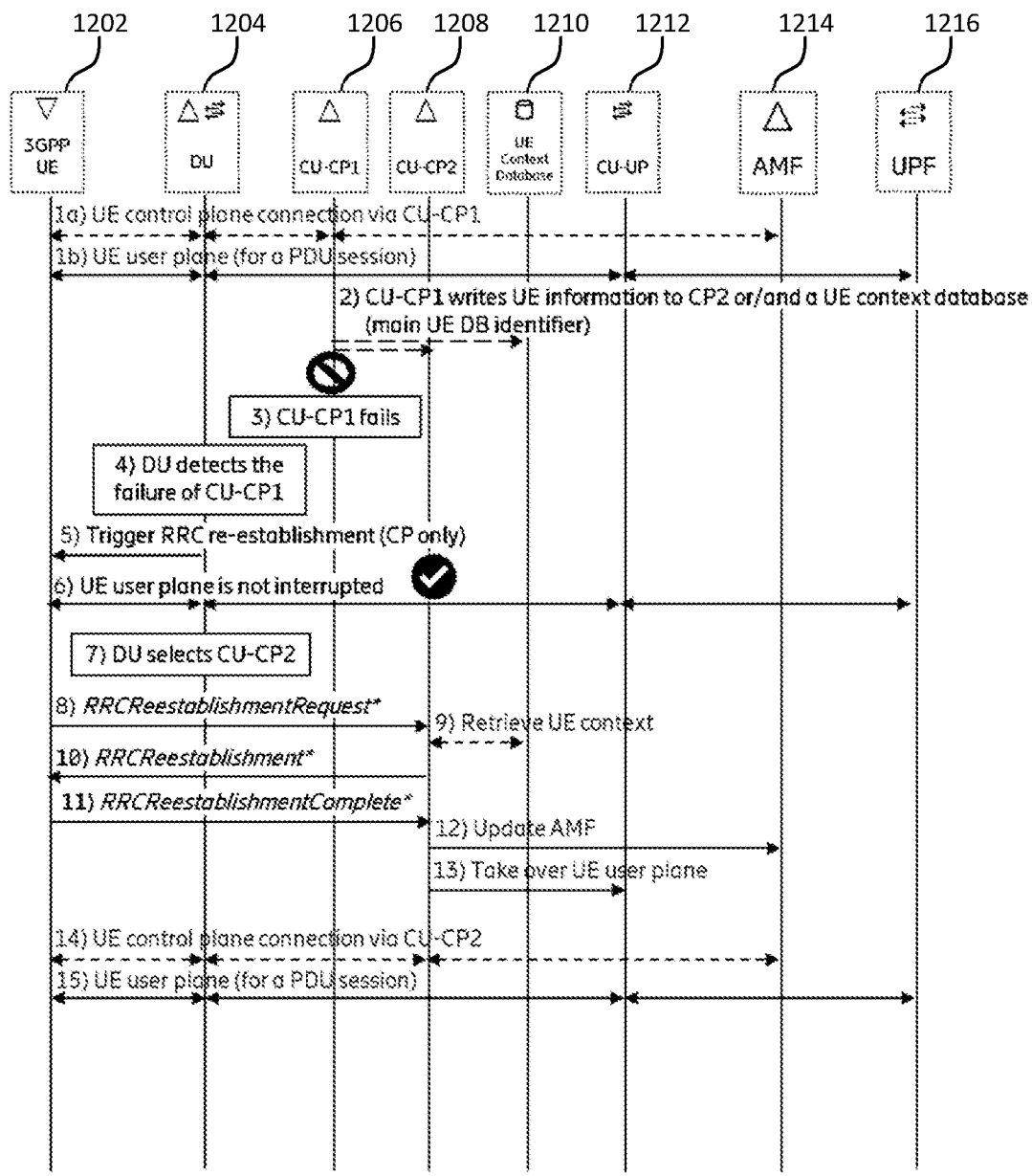
FIG. 13 illustrates another example of communications in a network.

The example shown in FIG. 12 makes it possible for the network to trigger the UE to re-establish the RRC connection and thereby ensure the UE context re-synchronization is performed. However, there may be possible interruption of user plane data. In order to mitigate this, in some examples, only the control plane or parts of the control plane (e.g. SRB1) need to be re-established. For example, the instruction received by the UE may trigger a control plane-only re-establishment procedure, and the UE can refrain from flushing the MAC/RLC buffers and not pause reception/transmission of data radio bearers. FIG. 13 illustrates an example of communications 1300 in a network according to such an example. The network includes a UE 1202, DU 1204, first control plane function CU-CP1 1206, second control plane function CU-CP2 1208, UE context database 1210, central unit-user plane (CU-UP) 1212, Access and Mobility Management Function (AMF) 1214 and User Plane Function (UPF) 1216.

Steps 1*a*) to 4) shown in FIG. 13 are similar to steps 1*a*) to 4) shown in FIG. 12 and described above. However, in step 5), the DU 1204 triggers control plane (CP)-only RRC re-establishment, and in step 6), the user plane connection is not interrupted. For example, the RLC and MAC buffers may not be flushed by the UE 1302 and DU 1304.

In step 7), the DU 1204 selects CU-CP2 1208. In step 8), the UE 1202 sends a RRC re-establishment request, e.g. in accordance with step 1004 described above. In step 9), CU-CP2 1208, which receives the request, retrieves the UE context from UE context database 1210. CU-CP2 1208 then sends a RRCReestablishment message to the UE 1202 in step 10). In step 11), the UE 1202 replies to the CU-CP2 1208 with a RRCReestablishmentComplete message.

In step 12), the CU-CP2 1208 updates the AMF 1214 (for example, CU-CP2 1208 updates the NG-C interface to the AMF 1214, for example by performing a Path Switch procedure indicating only move of NG-AP signaling association). In step 13), in this example, the same CU-UP 1212 is still used and the CU-CP2 1208 takes over the relevant UE contexts in the CU-UP 1212. In step 14), CU-CP2 1208 may trigger an optional resynchronization of the UE RRC state. This step may depend on the UE Context Database 1210 context, for example if there are any pending RRC procedures towards the UE. In step 15), UE 1202 has a user plane connection for a PDU session to UPF 1216 via DU 1204 and CU-UP 1212.

In the above, the message that was used to trigger the re-establishment in step 5) may in some examples be sent from the DU 1204 using a lower layer signaling (e.g. MAC control element (CE), downlink control information (DCI), system information block (SIB) signaling, etc). However, there are several alternative solutions. In one example, the DU 1204 may inform the CU-CP2 1208 about the unavailability of CU-CP1 1206, and the CU-CP2 1208 sends the re-establishment message to the UE 1202. The DU 1204 transparently forwards this to the UE 1202. Alternatively, for example, the CU-CP2 1208 may detect unavailability of CU-CP1 1206 and sends a control plane-only re-establishment instruction to the UE 1202 via the DU 1204. In either case, the DU can be informed (either implicitly in the re-establishment instruction or explicitly) that this is a control plane-only re-establishment and there is no need to flush the user plane buffer (e.g. MAC and RLC).

In some examples, the CU-CP2 1208 may generate an RRC packet and integrity protect it with an incorrect key (e.g. a random or alternative key) and send it to the UE 1202, as suggested above. The UE 1202 performs integrity verification on incoming RRC packets and will detect integrity verification failure. Legacy UEs will trigger a normal reestablishment procedure, whereas in some examples may attempt to perform a control plane-only re-establishment first as suggested above. Since the network knows that it has instructed a re-establishment by sending the RRC packet with incorrect integrity protection, it may in some examples perform a control plane-only re-establishment procedure.

A new re-establishment cause value (e.g. CP-Failure) can be introduced in some examples to let the network know the re-establishment is not initiated due to legacy re-establishment causes (such as radio link failure). This may be useful to the CU-CP2 1208, for example, if the control plane function failure was detected by the DU 1204, such that the DU 1204 is aware that it is a control plane-only re-establishment.

In the re-establishment request message (e.g. as sent in step 1004 described above), the UE may in some examples include the PDCP sequence number (SN) of the last received RRC (e.g. SRB1) message, or the next expected PDCP SN. The network may therefore verify if the UE has received the latest RRC message that it has sent, and if so, the UE and network context are in synchronization and there will be no need to send a subsequent reconfiguration message to the UE. If the network discovers that the UE context between the UE and the network are different (e.g. the last received PDCP SN indicated in the re-establishment message is less than the SN used for the last SRB1 message the network has sent to the UE), the network then could send a subsequent reconfiguration message to achieve synchronization.

In previous re-establishment procedures, the PDCP for SRB1 is re-established, which results in the sequence number (SN) for the SRB1 to be reset to an initial value. As a result, security keys are updated during re-establishment (using the received NCC in the re-establishment message) to ensure the same keys will not be used with the same SN. The change of the security keys for the control plane may also result in a change of the security keys for the user plane, which may mean that the RLC/MAC buffers have to be reset for the DRBs (as they contain data that was encrypted/integrity protected using the old keys), and all PDCP packets pending acknowledgements will need to be re-transmitted after being encrypted/integrity protected with the new keys. This may result in increased latency for user plane traffic. However, examples of this disclosure may mitigate these disadvantages. For example, the UE and network may not change the security key (e.g. user plane security key) or reset the sequence number for the control plane-only re-establishment procedure.

An example of changes to the 3GPP specification 38.331, v16.0.0 to enable the control plane-only re-establishment procedure as described herein is shown below.

---

5.3.7.2 Initiation
The UE initiates the procedure when one of the following conditions is met:
    1> upon detecting radio link failure of the MCG and T316 is not configured, in accordance with 5.3.10; or
    1> upon re-configuration with sync failure of the MCG, in accordance with sub-clause 5.3.5.8.3; or
    1> upon mobility from NR failure, in accordance with sub-clause 5.4.3.5; or
    1> upon integrity check failure indication from lower layers concerning SRB1 or SRB2, except if the integrity check failure is detected on the RRCReestablishment message; or
    1> upon an RRC connection reconfiguration failure, in accordance with sub-clause 5.3.5.8.2; or
    1> upon detecting radio link failure for the SCG while MCG transmission is suspended, in accordance with subclause 5.3.10.3 in NR-DC or in accordance with TS 36.331 [10] subclause 5.3.11.3 in NE-DC; or
    1> upon reconfiguration with sync failure of the SCG while MCG transmission is suspended in accordance with subclause 5.3.5.8.3; or
    1> upon SCG change failure while MCG transmission in NE-DC in accordance with TS 36.331 [10] subclause 5.3.5.7a; or1> upon SCG configuration failure while MCG transmission is suspended in accordance with subclause 5.3.5.8.2 in NR-DC or in accordance with TS 36.331 [10] subclause 5.3.5.5 in NE-DC; or
    1> upon integrity check failure indication from SCG lower layers concerning SRB3 while MCG is suspended; or
    1> upon T316 expiry, in accordance with sub-clause 5.7.3b.5; or
    1> on the reception of an indication from lower layers (MAC CE) that the network requests a re-establishment -continued Upon initiation of the procedure, the UE shall:
  1> stop timer T310, if running;
  1> stop timer T312, if running;
  1> stop timer T304, if running;
  1> start timer T311;
  1> stop timer T316, if running;
  1> if an indication from lower layers triggered the re-establishment and it indicates a control plane only re-establishment:
    2> initiate transmission of the RRCCPReestablishmentRequest message in accordance with 5.3.7.4;
  1> else:
    2> reset MAC;
    2> release the MCG SCell(s), if configured;
    2> if UE is not configured with conditionalReconfiguration:
      3> release spCellConfig, if configured;
      3> suspend all RBs, except SRB0;
    2> if MR-DC is configured:
      3> perform MR-DC release, as specified in clause 5.3.5.10;
    2> release delayBudgetReportingConfig, if configured, and stop timer T342, if running;
    2> release overheatingAssistanceConfig, if configured, and stop timer T345, if running;
    2> release idc-AssistanceConfig, if configured;
    2> release drx-PreferenceConfig, if configured, and stop timer T346a, if running;
    2> release maxBW-PreferenceConfig, if configured, and stop timer T346b, if running;
    2> release maxCC-PreferenceConfig, if configured, and stop timer T346c, if running;
    2> release maxMIMO-LayerPreferenceConfig, if configured, and stop timer T346d, if running;
    2> release minSchedulingOffsetPreferenceConfig, if configured, and stop timer T346e, if running;
    2> release releasePreferenceConfig, if configured, and stop timer T346f, if running;
    2> perform cell selection in accordance with the cell selection process as specified in TS 38.304 [20], clause 5.2.6.
5.3.7.3 Actions following cell selection while T311 is running
<<skipped text>>
5.3.7.4 Actions related to transmission of RRCReestablishmentRequest message
The UE shall set the contents of RRCReestablishmentRequest message as follows:
  1> if the procedure was initiated due to radio link failure as specified in 5.3.10.3 or handover failure as specified in 5.3.5.8.3:
    2> set the reestablishmentCellId in the VarRLF-Report to the global cell identity of the selected cell;
  1> set the ue-Identity as follows:
    2> set the c-RNTI to the C-RNTI used in the source PCell (reconfiguration with sync or mobility from NR failure) or used in the PCell in which the trigger for the re-establishment occurred (other cases);
    2> set the physCellId to the physical cell identity of the source PCell (reconfiguration with sync or mobility from NR failure) or of the PCell in which the trigger for the re-establishment occurred (other cases);
    2> set the shortMAC-I to the 16 least significant bits of the MAC-I calculated:
      3> over the ASN.1 encoded as per clause 8 (i.e., a multiple of 8 bits) VarShortMAC-Input;
      3> with the $K_{RRCint}$ key and integrity protection algorithm that was used in the source PCell (reconfiguration with sync or mobility from NR failure) or of the PCell in which the trigger for the re-establishment occurred (other cases); and
      3> with all input bits for COUNT, BEARER and DIRECTION set to binary ones;
  1> set the reestablishmentCause as follows:
    2> if the re-establishment procedure was initiated due to reconfiguration failure as specified in 5.3.5.8.2:
      3> set the reestablishmentCause to the value reconfigurationFailure;
    2> else if the re-establishment procedure was initiated due to reconfiguration with sync failure as specified in 5.3.5.8.3 (intra-NR handover failure) or 5.4.3.5 (inter-RAT mobility from NR failure):
      3> set the reestablishmentCause to the value handoverFailure;
    2> else if the re-establishment procedure was initiated due to the reception of an indication to trigger CP only re-establishment:
      3> set the reestablishmentCause to the value CP-Failure;
    2> else:
      3> set the reestablishmentCause to the value otherFailure;
  1> re-establish PDCP for SRB1;
  1> re-establish RLC for SRB1;
  1> apply the specified configuration defined in 9.2.1 for SRB1;
  1> configure lower layers to suspend integrity protection and ciphering for SRB1;
  NOTE: Ciphering is not applied for the subsequent RRCReestablishment message used to resume the connection. An integrity check is performed by lower layers, but merely upon request from RRC.
  1> resume SRB1;
  1> submit the RRCReestablishmentRequest message to lower layers for transmission.

-continued 5.3.7.5 Reception of the RRCReestablishment by the UE
The UE shall:
   1> stop timer T301;
   1> consider the current cell to be the PCell;
   1> if the a reestablishCP is indicated:
      2> submit the RRCReestablishmentComplete message to lower layers for
         transmission;
      2> the procedure ends.
   1> store the nextHopChainingCount value indicated in the RRCReestablishment
      message;
   1> update the $K_{gNB}$ key based on the current $K_{gNB}$ key or the NH, using the stored
      nextHopChainingCount value, as specified in TS 33.501 [11];
   1> derive the $K_{RRCenc}$ and $K_{UPenc}$ keys associated with the previously configured
      cipheringAlgorithm, as specified in TS 33.501 [11];
   1> derive the $K_{RRCint}$ and $K_{UPint}$ keys associated with the previously configured
      integrityProtAlgorithm, as specified in TS 33.501 [11].
   1> request lower layers to verify the integrity protection of the RRCReestablishment
      message, using the previously configured algorithm and the $K_{RRCint}$ key;
   1> if the integrity protection check of the RRCReestablishment message fails:
      2> perform the actions upon going to RRC_IDLE as specified in 5.3.11, with release
         cause 'RRC connection failure', upon which the procedure ends;
   1> configure lower layers to resume integrity protection for SRB1 using the previously
      configured algorithm and the $K_{RRCint}$ key immediately, i.e., integrity protection shall be
      applied to all subsequent messages received and sent by the UE, including the
      message used to indicate the successful completion of the procedure;
   1> configure lower layers to resume ciphering for SRB1 using the previously configured
      algorithm and, the $K_{RRCenc}$ key immediately, i.e., ciphering shall be applied to all
      subsequent messages received and sent by the UE, including the message used to
      indicate the successful completion of the procedure;
   1> release the measurement gap configuration indicated by the measGapConfig, if
      configured;
   1> set the content of RRCReestablishmentComplete message as follows:
      2> if the UE has logged measurements available for NR and if the RPLMN is included
         in plmn-IdentityList stored in VarLogMeasReport:
         3> include the logMeasAvailable in the RRCReestablishmentComplete message;
      2> if the UE has Bluetooth logged measurements available and if the RPLMN is
         included in plmn-IdentityList stored in VarLogMeasReport:
         3> include the logMeasAvailableBT in the RRCReestablishmentComplete message;
      2> if the UE has WLAN logged measurements available and if the RPLMN is included
         in plmn-IdentityList stored in VarLogMeasReport:
         3> include the logMeasAvailableWLAN in the RRCReestablishmentComplete
            message;
      2> if the UE has connection establishment failure information available in
         VarConnEstFailReport and if the RPLMN is equal to plmn-Identity stored in
         VarConnEstFailReport:
         3> include connEstFailInfoAvailable in the RRCReestablishmentComplete
            message;
      2> if the UE has radio link failure or handover failure information available in
         VarRLF-Report and if the RPLMN is included in plmn-IdentityList stored in
         VarRLF-Report:3>      include rlf-InfoAvailable in the
         RRCReestablishmentComplete message;
      2> if the UE has radio link failure or handover failure information available in VarRLF-
         Report of TS 36.331 [10] and if the UE is capable of cross-RAT RLF reporting and if
         the RPLMN is included in plmn-IdentityList stored in VarRLF-Report of TS 36.331
         [10]:
         3> include rlf-InfoAvailable in the RRCReestablishmentComplete message;
   1> submit the RRCReestablishmentComplete message to lower layers for transmission;
1>     the procedure ends.

Figure 14:
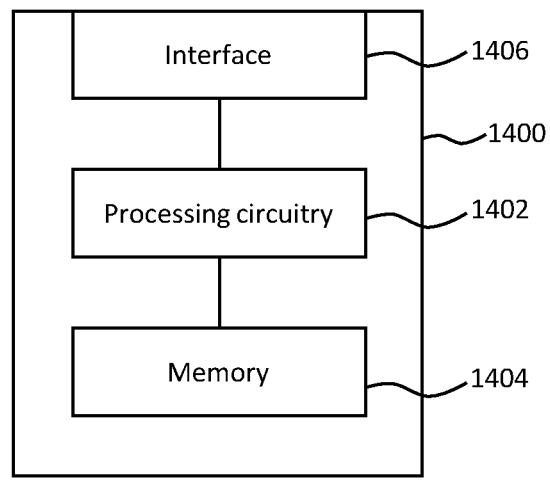
FIG. 14 is a schematic of an example of apparatus 1400 n a User Equipment (UE) for performing a RRC re-establishment procedure.

FIG. 14 is a schematic of an example of apparatus 1400 n a User Equipment (UE) for performing a RRC re-establishment procedure. The apparatus 1400 comprises processing circuitry 1402 (e.g. one or more processors) and a memory 1404 in communication with the processing circuitry 1402. The memory 1404 contains instructions executable by the processing circuitry 1402. The apparatus 1400 also comprises an interface 1406 in communication with the processing circuitry 1402. Although the interface 1406, processing circuitry 1402 and memory 1404 are shown connected in series, these may alternatively be interconnected in any other way, for example via a bus.

In one embodiment, the memory 1404 contains instructions executable by the processing circuitry 1402 such that the apparatus 1400 is operable to receive an instruction from a network node to perform a RRC re-establishment procedure, and transmit a RRC re-establishment request. In some examples, the apparatus 1400 is operable to carry out the method 1000 described above with reference to FIG. 10.

Figure 15:
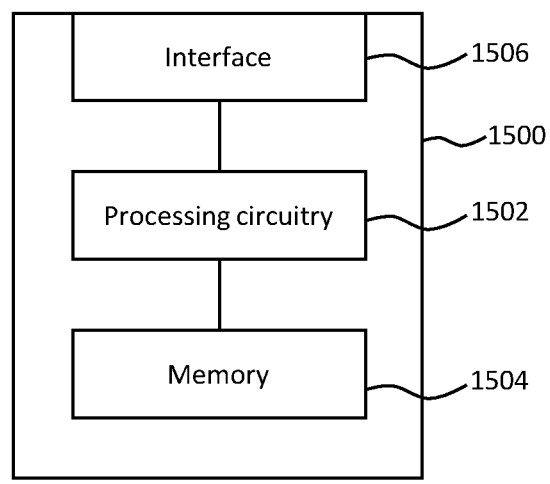
FIG. 15 is a schematic of an example of apparatus 1500 in a network node of instructing a User Equipment (UE) to perform a RRC re-establishment procedure.

FIG. 15 is a schematic of an example of apparatus 1500 in a network node of instructing a User Equipment (UE) to perform a RRC re-establishment procedure. The apparatus 1500 comprises processing circuitry 1502 (e.g. one or more processors) and a memory 1504 in communication with the processing circuitry 1502. The memory 1504 contains instructions executable by the processing circuitry 1502. The apparatus 1500 also comprises an interface 1506 in communication with the processing circuitry 1502. Although the interface 1506, processing circuitry 1502 and memory 1504 are shown connected in series, these may alternatively be interconnected in any other way, for example via a bus.

In one embodiment, the memory 1504 contains instructions executable by the processing circuitry 1502 such that the apparatus 1500 is operable to determine that a first base station control plane function associated with a UE is unavailable, and send an instruction to the UE to perform a RRC re-establishment procedure to cause the UE to re-establish at least a control plane connection with a second base station control plane function. In some examples, the apparatus 1500 is operable to carry out the method 1100 described above with reference to FIG. 11.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim, "a" or "an" does not exclude a plurality, and a single processor or other unit may fulfil the functions of several units recited in the statements below. Where the terms, "first", "second" etc. are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method in a User Equipment (UE) of performing a Radio Resource Control (RRC) re-establishment procedure, the method comprising:
   receiving an instruction from a network node to perform a RRC re-establishment procedure, wherein the instruction from the network node comprises an instruction to perform a control-plane only re-establishment procedure; and
   transmitting a RRC re-establishment request, wherein the RRC re-establishment request comprises a request to re-establish only a RRC control plane connection for the UE.

2. The method of claim 1, comprising maintaining a user plane UE context for the UE.

3. The method of claim 2, wherein maintaining the user plane UE context for the UE comprises continuing to use one or more data radio bearers (DRBs) configured before receiving the instruction.

4. The method of claim 1, comprising performing the RRC re-establishment procedure without suspending user plane data radio bearers (DRBs).

5. The method of claim 1, wherein the UE is associated with a first base station control plane function before receiving the instruction, and the RRC re-establishment procedure re-establishes a control plane connection to a second base station control plane function.

6. The method of claim 5, comprising receiving a RRC re-establishment message from the second base station control plane function in response to the RRC re-establishment request.

7. The method of claim 5, wherein the instruction is received from the second base station control plane function via the network node.

8. The method of claim 1, comprising refraining from flushing a MAC buffer and/or a RLC buffer during, and/or without resetting a next expected RRC message sequence number during the RRC re-establishment procedure.

9. The method of claim 1, wherein receiving the instruction from the network node to comprises:
   receiving a RRC message from the network node;
   performing integrity verification on the RRC message using an integrity verification key; and
   determining that the RRC message is an instruction to perform a RRC re-establishment procedure if the integrity verification fails.

10. The method of claim 1, wherein the instruction is received in a MAC control element (CE), in Downlink Control Information (DCI) transmitted over a Physical Downlink Control Channel (PDCCH), in a flag in a System Information Block (SIB), or in a broadcast message.

11. The method of claim 1, wherein the RRC re-establishment request includes an indication of a sequence number of a most recently received RRC message before receiving the instruction.

12. The method of claim 1, wherein the network node comprises a base station distributed unit (DU) associated with the UE.

13. A method in a network node of instructing a User Equipment (UE) to perform a Radio Resource Control (RRC) re-establishment procedure, the method comprising:
   determining that a first base station control plane function associated with a UE is unavailable; and
   sending an instruction to the UE to perform a RRC re-establishment procedure, to cause the UE to re-establish at least a control plane connection with a second base station control plane function;
   wherein the instruction comprises an instruction to perform a control-plane only re-establishment procedure.

14. The method of claim 13, comprising, after sending the instruction to the UE, receiving a RRC re-establishment request from the UE, and forwarding the RRC re-establishment request to the second base station control plane function.

15. The method of claim 14, wherein
   the RRC re-establishment request includes an indication of a sequence number of a most recently received RRC message before receiving the instruction.

16. The method of claim 13, comprising maintaining a user plane UE context for the UE, based on continuing to use one or more data radio bearers (DRBs) configured before receiving the instruction.

17. The method of claim 13, wherein the instruction comprises an instruction to the UE to perform a RRC re-establishment procedure without suspending user plane data radio bearers (DRBs).

18. The method of claim 13, wherein the UE is associated with a first base station control plane function before receiving the instruction, and the RRC re-establishment procedure re-establishes a control plane connection to a second base station control plane function.

19. A User Equipment (UE) configured to perform a Radio Resource Control (RRC) re-establishment procedure, the UE comprising a processor and a memory, the memory containing instructions executable by the processor such that the UE is caused to:
   receive an instruction from a network node to perform a RRC re-establishment procedure, wherein the instruction from the network node comprises an instruction to perform a control-plane only re-establishment procedure; and
   transmit a RRC re-establishment request, wherein the RRC re-establishment request comprises a request to re-establish only a RRC control plane connection for the UE.

20. A network node configured to instruct a User Equipment (UE) to perform a Radio Resource Control (RRC) re-establishment procedure, the network node comprising a processor and a memory, the memory containing instructions executable by the processor such that the network node is caused to:
  determine that a first base station control plane function associated with a UE is unavailable; and
  send an instruction to the UE to perform a RRC re-establishment procedure to cause the UE to re-establish at least a control plane connection with a second base station control plane function, wherein the instruction comprises an instruction to perform a control-plane only re-establishment procedure.

* * * * *